(12) United States Patent
Tsai

(10) Patent No.: US 7,396,148 B1
(45) Date of Patent: Jul. 8, 2008

(54) FOLDABLE LIGHTING SYSTEM

(75) Inventor: Sean Shen Hsun Tsai, 20651 Golden Springs Rd., Suite 386, Walnut, CA (US) 91789

(73) Assignee: Sean Shen Hsun Tsai, Walnut, CA (US)

( * ) Notice: Subject to any disclaimer, the term of this patent is extended or adjusted under 35 U.S.C. 154(b) by 0 days.

(21) Appl. No.: 11/700,595

(22) Filed: Jan. 30, 2007

(51) Int. Cl.
*F21V 1/06* (2006.01)
*G03B 15/02* (2006.01)

(52) U.S. Cl. .............................. 362/352; 362/17; 362/18

(58) Field of Classification Search ............. 362/6, 362/7, 8, 11, 12, 16, 17, 18, 154, 352, 355, 362/359, 362, 373, 374, 375, 449, 450, 3, 362/10
See application file for complete search history.

(56) References Cited

U.S. PATENT DOCUMENTS

| 384,151 | A | | 6/1888 | Gould |
| 523,323 | A | | 7/1894 | Clinedinst, Jr. |
| 2,754,412 | A | * | 7/1956 | Noguchi ................. 362/352 |
| 2,913,569 | A | * | 11/1959 | Edelstein ................ 362/17 |
| 3,643,085 | A | | 2/1972 | Durand |
| 3,806,219 | A | | 4/1974 | Ahmann |
| 4,120,025 | A | * | 10/1978 | Deaven ................. 362/362 |
| 4,292,662 | A | | 9/1981 | Gasperini |
| 4,504,888 | A | * | 3/1985 | Rosenthal .............. 362/18 |
| 5,311,409 | A | * | 5/1994 | King ...................... 362/17 |
| 5,664,232 | A | | 9/1997 | Goto |
| 5,778,258 | A | | 7/1998 | Zamoyski |
| 5,915,828 | A | * | 6/1999 | Buckley ................ 362/18 |
| 6,106,124 | A | | 8/2000 | Tarsia |
| 6,519,089 | B2 | * | 2/2003 | Graham ................ 362/16 |
| 6,659,620 | B2 | | 12/2003 | Goto |
| 6,672,737 | B2 | | 1/2004 | Lai et al. |
| 7,055,976 | B2 | | 6/2006 | Blanford |

\* cited by examiner

*Primary Examiner*—Y M. Lee
(74) *Attorney, Agent, or Firm*—Finnegan, Henderson, Farabow, Garrett & Dunner, LLP

(57) ABSTRACT

A foldable lighting system may include a light housing having a light source. The foldable lighting system may also include a base panel, a back panel, and two side panels. The back panel may be pivotally coupled to the light housing and foldable relative to the light housing. Each of the two side panels may have at least two sections, a first section pivotally coupled to the light housing, and a second section pivotally coupled to the base panel. The first section and the second section of each of the side panels may be pivotally coupled to each other.

19 Claims, 7 Drawing Sheets

FOLDABLE LIGHTING SYSTEM

TECHNICAL FIELD

The present disclosure relates generally to a lighting system, and more particularly, to a foldable lighting system for providing lighting for photographing.

BACKGROUND

E-commerce over the Internet has increased significantly over the past few years. Part of e-commerce enables users/customers to buy and/or sell products on online stores. Selling products at online stores often requires users to take photos of their products and upload the photos to the online stores. Currently available consumer digital cameras with photo editing software make it possible for individuals and/or small business owners to take digital photographs of products without the expense or need of a professional photographer.

However, in order to take beautiful photos of photo objects, sufficient and substantially uniform lighting must be provided to the products during photographing. Individuals and/or small business owners often lack the facilities that a photo studio has to provide sufficient and substantially uniform lighting to the photo objects.

One method for providing a studio lighting environment is described in U.S. Pat. No. 7,055,976 (the '976 patent) issued to Blanford. The '976 patent describes a collapsible tabletop lighting apparatus consisting of a box-like structure and a detachable single circular fluorescent lighting unit. Although the system of the '976 patent may provide a lighting system for providing lighting for taking photographs of objects, it employs a two-piece design, in which an independent lighting unit is installed on a box-like structure. A user has to assemble the lighting unit onto the box-like structure every time when the user uses the system. Assembling the system is time consuming and inconvenient.

The disclosed system is directed to overcoming one or more of the problems set forth above.

SUMMARY OF THE INVENTION

In one aspect, the present disclosure is directed to a foldable lighting system. The foldable lighting system may include a light housing having a light source, a base panel, a back panel, and two side panels. The back panel may be pivotally coupled to the light housing and be foldable relative to the light housing. Each of the two side panels may include at least two sections, a first section pivotally coupled to the light housing and a second section pivotally coupled to the base panel. The first section and the second section of each of the side panels are pivotally coupled to each other.

In another aspect, the foldable lighting system may include a light housing having a light source and a diffusing panel disposed at a bottom of the light housing. The foldable lighting system may also include a box structure supporting the light housing. The box structure may have a base panel, a back panel, and two side panels. The back panel may be pivotally coupled to a frame of the box structure and foldable relative to the light housing. Each of the two side panels may have at least two sections, a first section pivotally coupled to the frame of the box structure, and a second section pivotally coupled to the base panel. The first section and the second section of each of the side panels may be pivotally coupled to each other.

The present disclosure further includes a method of converting a foldable lighting system from a working mode to a folded mode. The foldable lighting system may include a light housing, and a box structure supporting the light housing. The box structure may have a base panel, a back panel, and two side panels. The method may include folding the back panel inwardly and upwardly relative to the light housing via a pivot connection between the back panel and light housing. The method may further include folding a first section of each side panel inwardly relative to the light housing via a pivot connection between the first section and the light housing, folding a second section of each side panel inwardly relative to the base panel via a pivot connection between the second section and the base panel, and folding the first section and the second section toward each other via a pivot connection between the first section and the second section.

DETAILED DESCRIPTION

Figure 1:
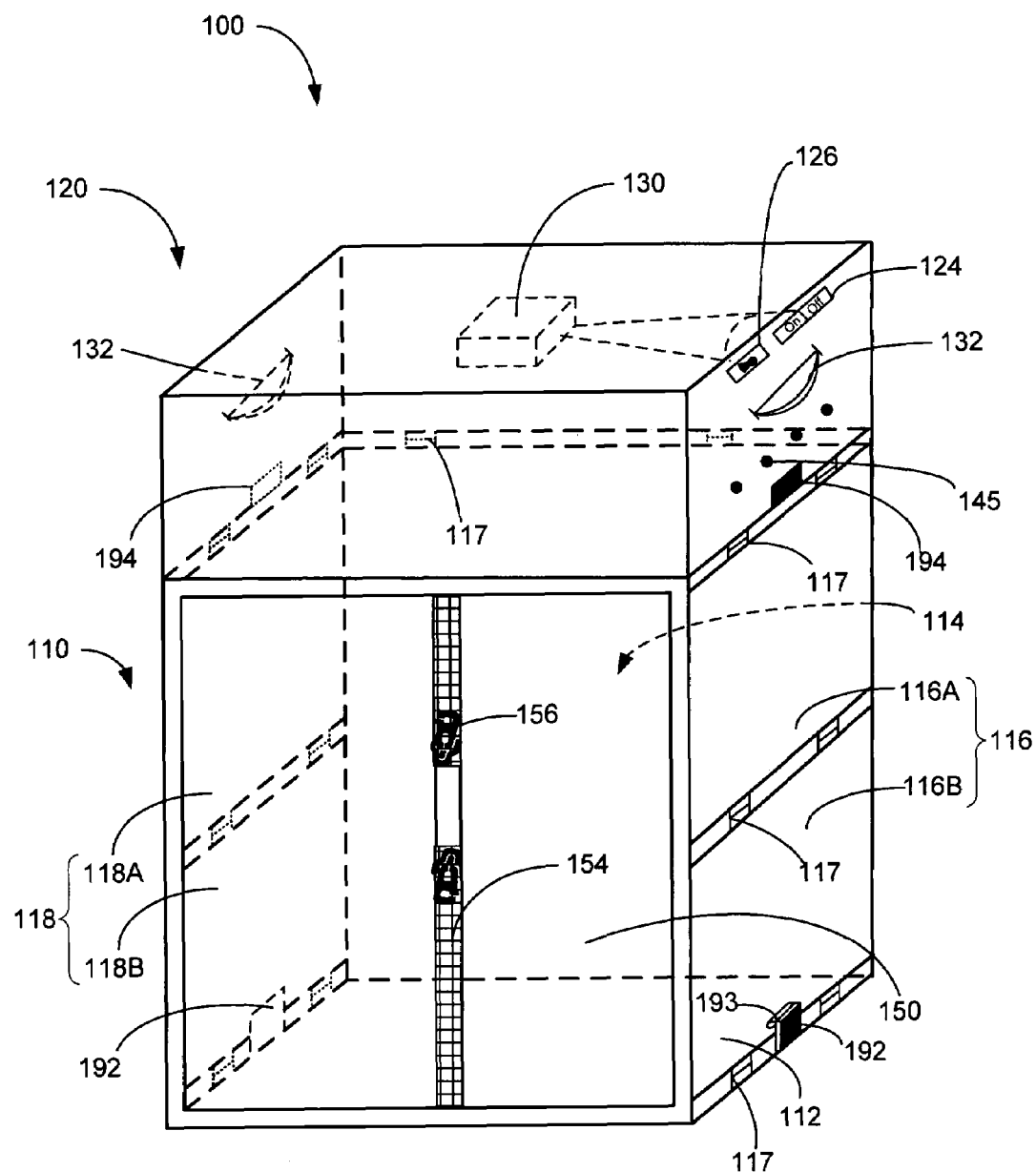
FIG. 1 is a perspective view of a foldable lighting system in a working mode according to one exemplary embodiment of the disclosure.

FIG. 1 illustrates an exemplary foldable lighting system 100 in a working mode according to one exemplary embodiment of the present disclosure. In the exemplary embodiment depicted in FIG. 1, the foldable lighting system 100 may include a box structure 110 and a light housing 120. The light housing 120 may be supported by the box structure 110. The box structure 110 may serve as a tent within which an object may be placed for photo shooting. The light housing 120 and the box structure 110 may be manufactured as an integral unit. Alternatively, the light housing 120 and the box structure 110 may be manufactured as separate units and are installed together. The lighting system 100 may provide uniform lighting to the photo object placed in the box structure 110 for photo shooting.

The box structure 110 may include a base panel 112, a back panel 114, and two side panels 116 and 118. The side panel 116 may include at least two sections, a first (upper) section 116A and a second (lower) section 116B. The upper section 116A and the lower section 116B may be pivotally coupled to each other, for example, by hinges 117. Similarly, the side panel 118 may include an upper section 118A and a lower section 118B pivotally coupled to each other, for example, by hinges 117. In one exemplary embodiment, the upper sections 116A and 118A may be pivotally coupled to the light housing 120, for example, by hinges 117. The lower sections 116B and 118B may be pivotally coupled to the base panel 112, for example, by hinges 117. In one exemplary embodiment, the back panel 114 may be pivotally coupled to the light housing 120, for example through hinges 117. In another embodiment (not shown), the back panel 114 may be pivotally coupled to the base panel 112.

Figure 4:
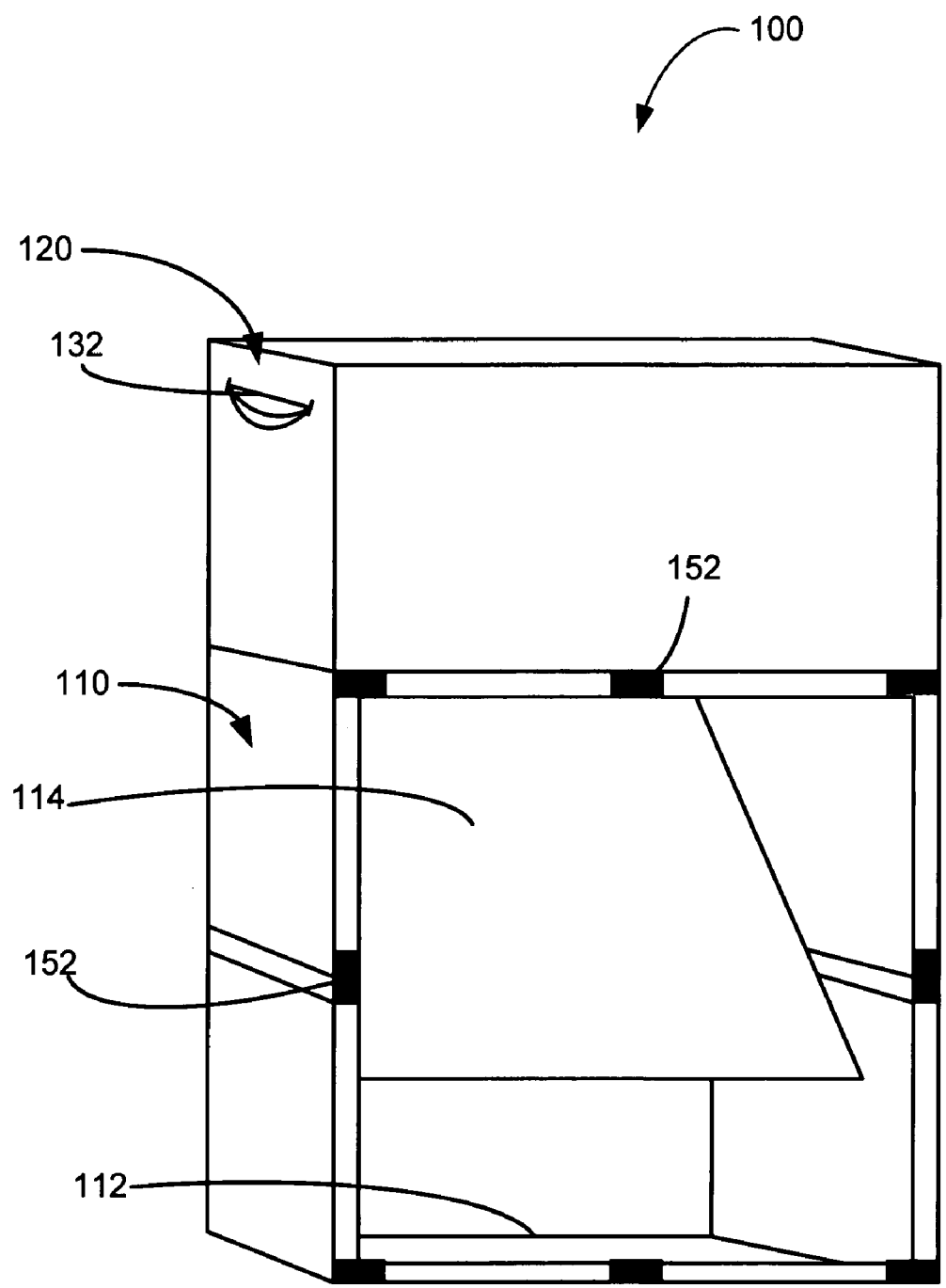
FIG. 4 is a perspective view of the foldable lighting system of FIG. 1 showing a back panel being partially folded in a conversion process a working mode and a folded mode.

As shown in FIG. 1, the box structure 110 may further include a front cover 150. In one exemplary embodiment, the front cover 150 may be removably attached to a front face of the box structure 110. In one exemplary embodiment, the front cover 150 may be removably attached to the box structure 110 by hook and loop fasteners 152 as shown in FIG. 4. The hook and loop fasteners 152 have one of a loop or a hook surface section attached to the box structure as shown in FIG. 4, and the other surface section attached to the front cover 150. A person skilled in the art should appreciate that other fasteners may be used to attach the front cover 150 to the box structure 110. The front cover 150 may include a selectively operable closure assembly 154. In one exemplary embodiment, as shown in FIG. 1, the selectively operable closure assembly 154 may be a zipper 154 having one or more zip heads 156. The zipper 154 may be configured to open and close the front cover 150 based upon a need to completely close the foldable lighting system 100 for shooting highly reflective items. In one exemplary embodiment, the zipper 154 may have double zipper heads 156 and may be configured to enclose the front cover around a camera lens. In one exemplary embodiment, the front cover 150 may have a white color and be made from vinyl.

In one exemplary embodiment, the light housing 120 and the box structure 110 may be manufactured as separate units and are installed together. The light housing 120 may be pivotally coupled to the box structure 110. For example, one bottom edge of the light housing 120 may be hingedly coupled to the box structure 110 such that the light housing 120 can be hingedly opened.

The light housing 120 may further include a pair of handles 132 mounted on two sides of the light housing 120. By lifting the light housing 120 via the handles 132, the back panel 114 will drop to an upright position (as shown in FIG. 4), and the two side panels 116 and 118 will be unfolded to an upright position. The lighting system 110 can be completely converted from a folded mode to a working mode. The process of conversion of the lighting system 100 between the working mode and the folded mode will be described in detail below. Furthermore, a user can carry the foldable lighting system 100 via the handles 132, so as to facilitate transportation of the foldable lighting system 100. In some exemplary embodiments, as shown in FIG. 1, the light housing 120 may further include at least one ventilation hole 145 through side panels of the light housing 120. The ventilation holes 145 may be configured to provide ventilation to the light housing 120.

Figure 2:
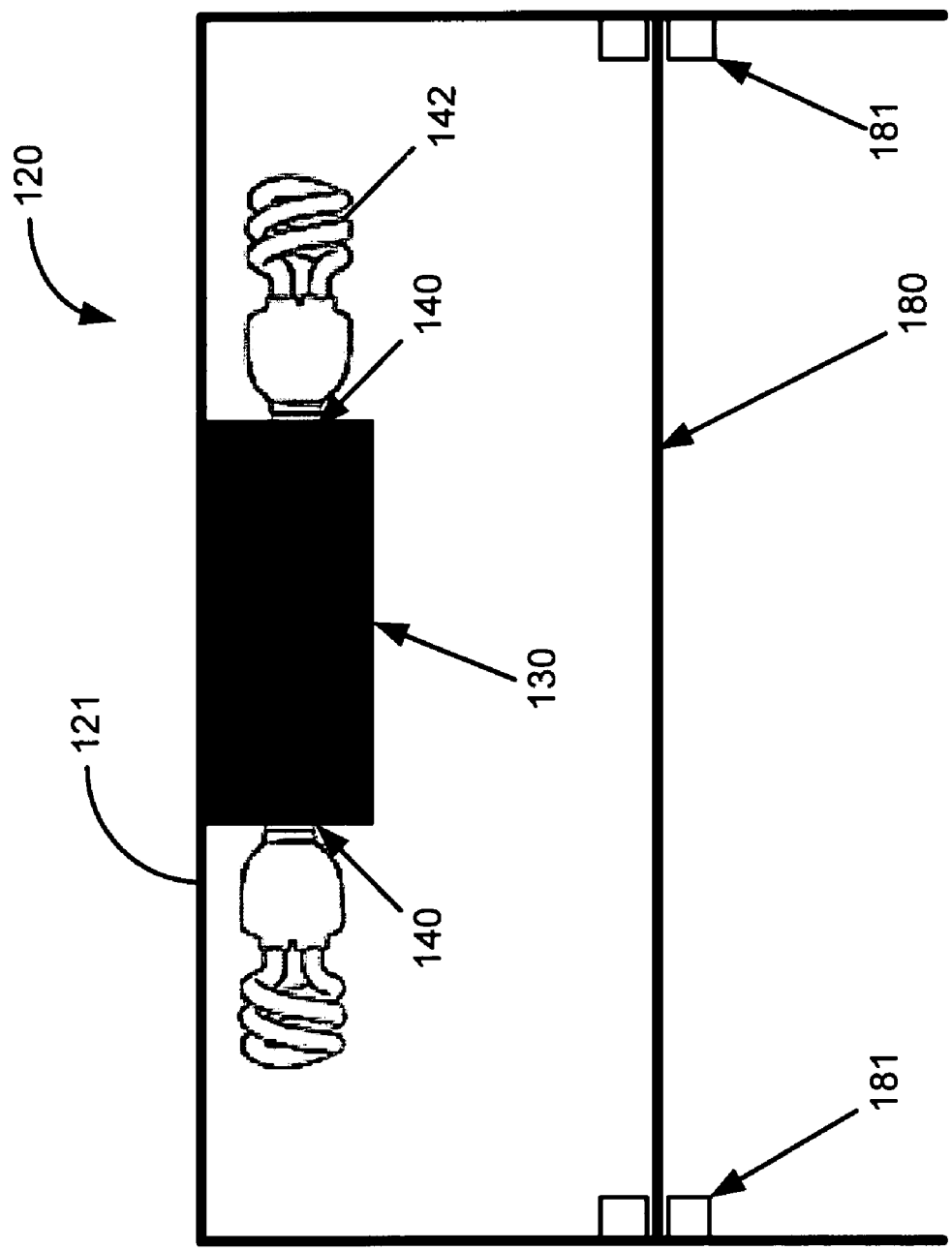
FIG. 2 is a perspective view of a compact fluorescent lighting source used with the foldable lighting system of FIG. 1 according to one exemplary embodiment of the disclosure.

In an exemplary embodiment as depicted in FIGS. 1 and 2, the light housing 120 may include a light source 130. The light source 130 may include at least one, for example, two sockets 140. In one exemplary embodiment, the sockets 140 may be mounted on a top panel 121 of the light housing 120. In one exemplary embodiment, the light source 130 may include at least one, for example, two compact fluorescent light bulbs 142 coupled to the sockets 140. In one embodiment, the light source 130 may include a pair of spiral fluorescent light bulbs 142. The light system 130 may include more or less light bulbs in accordance with a need of more or less light in the foldable lighting system 100. A person skilled in the art should appreciate that the light source 130 may use lighting systems other than the compact fluorescent light bulbs 142 to provide lighting for photo shooting.

As shown in FIG. 2, the foldable lighting system 100 may further include a diffusing panel 180 disposed at the bottom of the light housing 120, such that the light housing 120 may provide substantially uniformly diffused lighting onto an object in the box structure 110. In one exemplary embodiment, the diffusing panel 180 may be translucent. In one exemplary embodiment, the diffusing panel 180 may be removably attached to the light housing 120, for example, by hook and loop fasteners or screws. In another exemplary embodiment, the light housing 120 may include sliding channels 181, and the diffusing panel 180 may slide into the sliding channels between the light housing 120 and the box structure 110. In another embodiment, the diffusing panel 180 may be removably attached to the box structure 110. In a further exemplary embodiment, the diffusing panel 180 may be integrated with the light housing 120. In yet another exemplary embodiment, the diffusing panel 180 may be integrated with the box structure 110. The diffusing panel 180 may be embodied as a plastic plate or sheet. Alternatively, the diffusing panel 180 may be embodied as a sheet made from other material or any other suitable device for providing substantially uniformly diffused lighting through the diffusing panel to an object in the box structure 110.

As shown in FIG. 1, the light source 130 may include a switch 124 to control on/off of the light source 130. The light source 130 may further include a power plug 126 for connecting the light source 130 to a power source. In one exemplary embodiment, the power plug 126 may be a universal power plug that can be used with power sources having 100-240 Volts. In another exemplary embodiment, the lighting system 100 may include a battery as the power source, and the light source 130 may be coupled to the battery power source.

The foldable lighting system 100 may further include a pair of locks 190. The lock 190 may include a clip 192 mounted on the box structure 110, for example, the base panel 112. The clip 192 may include a hook structure 193 extending from the clip 192. The lock 190 may further include a tab 194 mounted on the light housing 120. When the box structure 110 is folded, the hook structure 193 may engage the tab 194 and lock the light housing 120 and the folded box structure 110 together. A force applied in a radial and outward direction to the clip 192 may disengage the hook structure 193 from the tab 194 to unlock the folded box structure 110 from the light housing 120.

Figure 3:
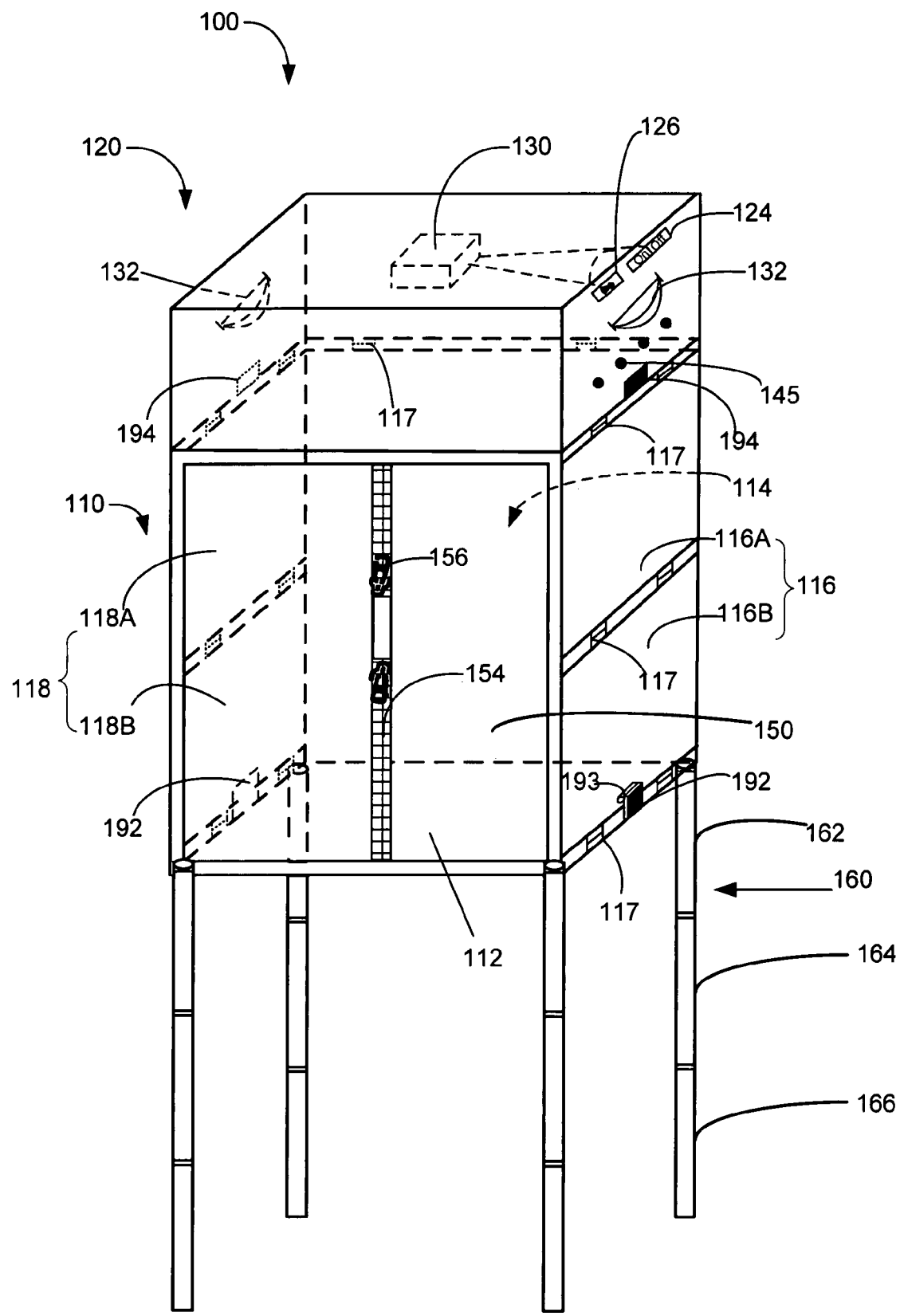
FIG. 3 is a perspective view of the foldable lighting system of FIG. 1 with legs according to one exemplary embodiment of the disclosure.

As shown in FIG. 3, the box structure 110 may further include legs 160 attached to the base panel 112 of the box structure 110 for supporting the box structure 110. In one embodiment, the legs 160 may be removably attached to the box structure 110, for example, by screw threads. In one exemplary embodiment, the legs 160 may each include a plurality sections removably coupled to each other. In one exemplary embodiment, each of the legs 160 may include three sections 162, 164 and 166. The sections 162, 164 and 166 may be removably coupled to each by screw threads. A person skilled in the art should understand that the legs 160 may be embodied in other types of supporting structures. For example, the legs 160 may be pivotally coupled to the base panel 112, and can be folded and received underneath the base panel 112.

INDUSTRIAL APPLICABILITY

The disclosed foldable lighting system 100 may be applicable for shooting photos of an object in any working environment that includes indoors and outdoors. The disclosed foldable lighting system may be foldable and portable, and may provide substantially uniform light for photo shooting.

Figure 5:
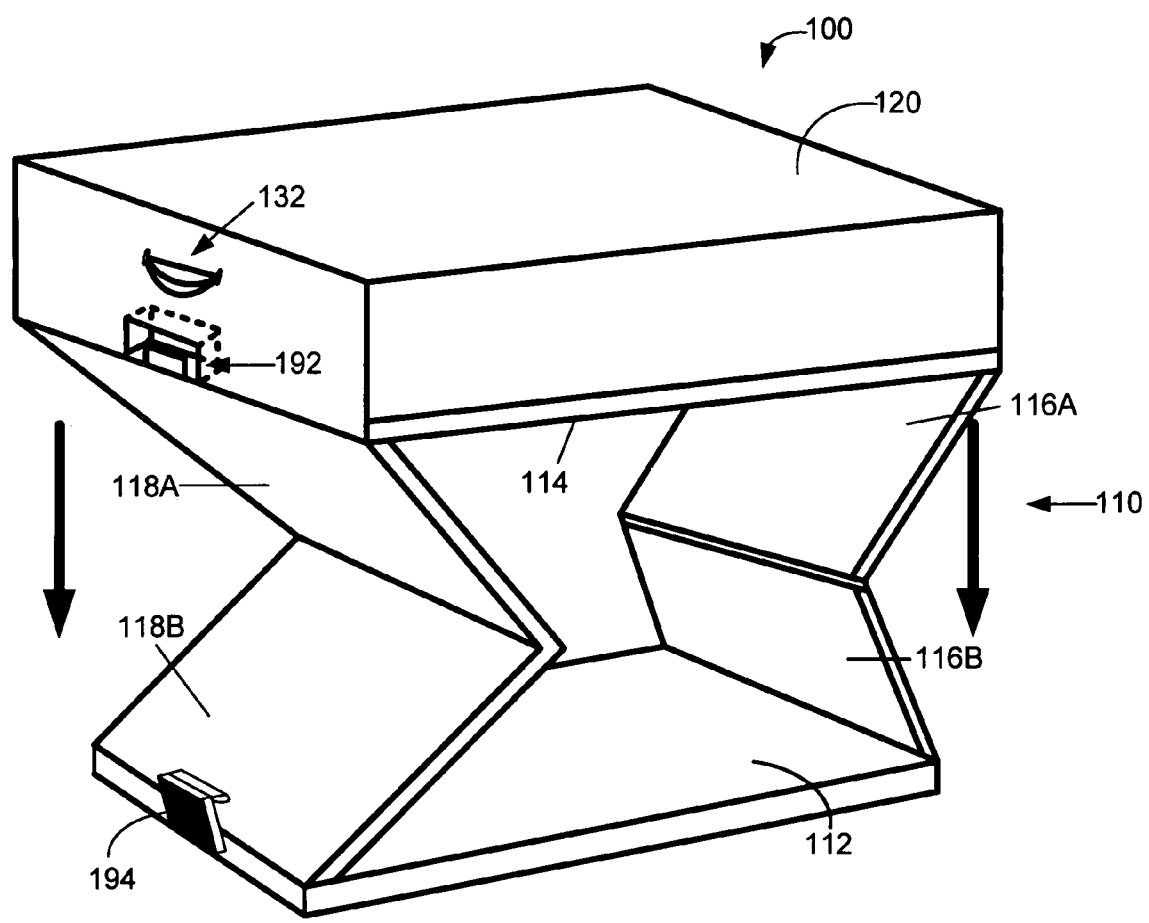
FIG. 5 is a perspective view of the foldable lighting system of FIG. 1 showing side panels being partially folded in the conversion process between the working mode and the folded mode.
Figure 6:
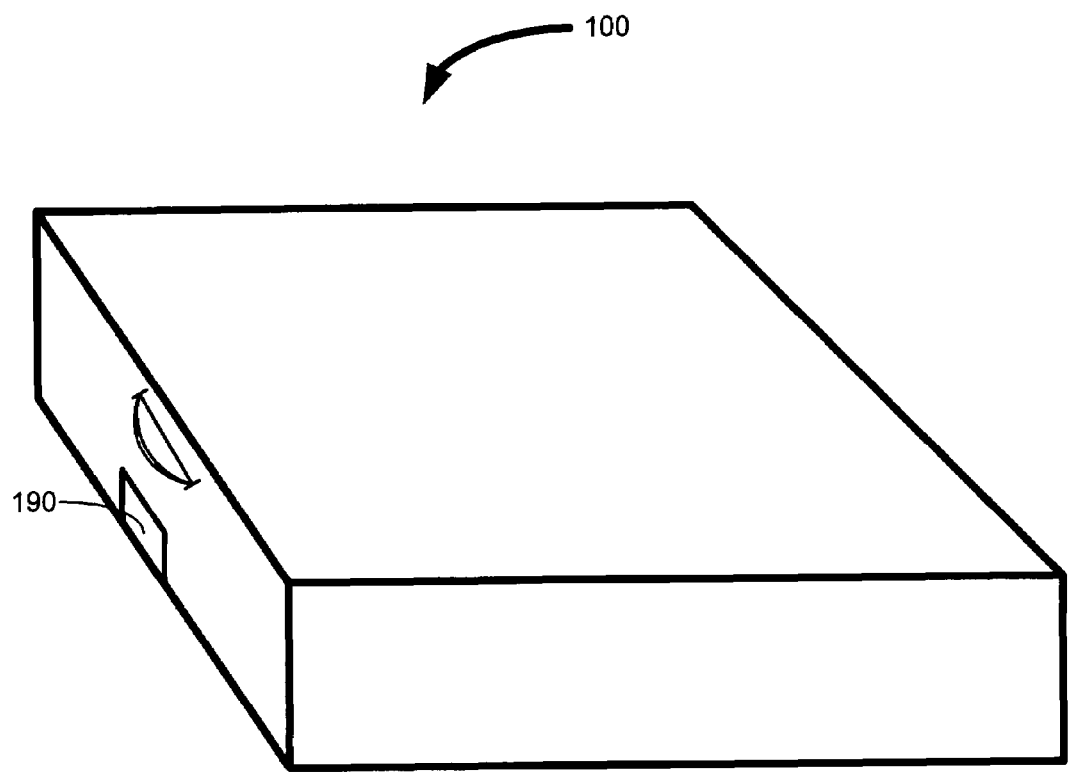
FIG. 6 is a perspective view of the foldable lighting system of FIG. 1 in the folded mode.

FIGS. 4-6 show how the foldable lighting system 100 being converted between a working mode and a folded mode. As shown in FIG. 4, in one exemplary embodiment, a user may hold the foldable lighting system 100 by holding the pair of handles 132 of the light housing 120 during the opening/folding processes.

Figure 7:
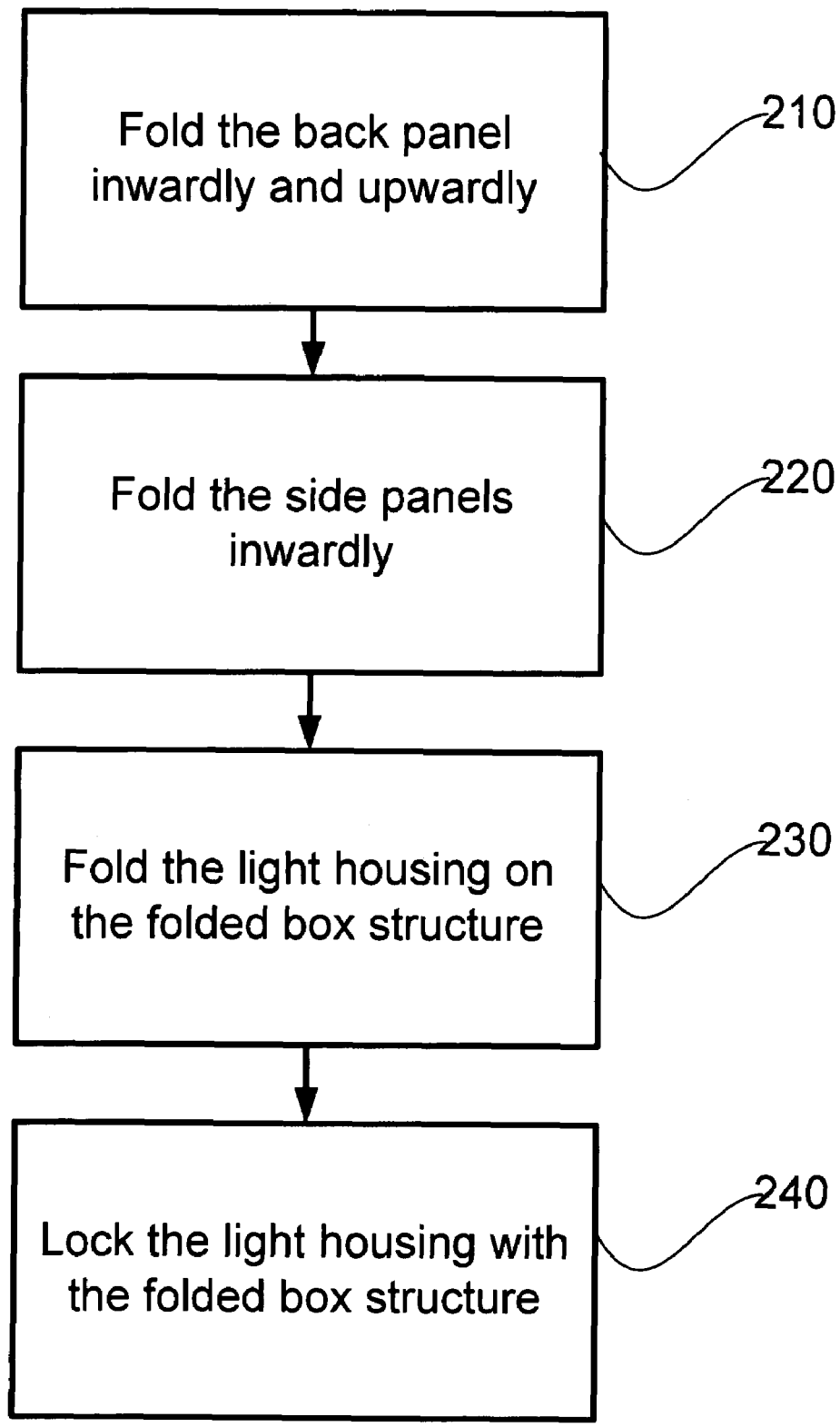
FIG. 7 is a flow chart illustrating a folding process according to an exemplary embodiment of the present disclosure.

FIG. 7 shows a flow chart of a process of folding the lighting system 100 from the working mode to the folded mode. At step 210, the back panel 114 may be folded inwardly and upwardly relative to the light housing 120 via a pivot connection (for example, hinges 117 as shown in FIG. 1) between the back panel 114 and the light housing 120. At step 220 as shown in FIG. 5, the upper sections 116A and 118A of the side panels 116 and 118 may be folded inwardly relative to the light housing 120 via pivot connections between the upper sections 116A and 118A and the light housing 120. The lower sections 116B and 118B of the side panels 116 and 118 may be folded inwardly relative to the base panel 112 via pivot connections between the lower sections 116B and 118B and the base panel 112. At the same time, the upper sections 116A and 118A and the lower sections 116B and 118B are folded toward each other via pivot connections between the upper sections 116A and 118A and the lower sections 116B and 1118B.

At step 230, after the side panels 116 and 118 are folded on the base panel 112, the folded back panel 114 with the light housing 120 lie over the folded side panels 116 and 118 and the base panel 112. At step 240, the folded box structure 110 is locked together with the light housing 120 by the locks 190, such that the folded light system 100 can be easily transported. FIG. 6 is a perspective view of the foldable lighting system 100 in a fully folded mode.

Several advantages over the prior art may be associated with the disclosed portable and foldable lighting system. The lighting system can be completely folded to a relatively small box structure, and that makes it easy to be carried to different locations. The foldable lighting system can be easily converted from a folded mode to a working mode by lifting the handles of the foldable lighting system. The foldable lighting system can be placed in an upright position with the object placed on the base panel, and a photographer can shoot photos of the object from the front or side of the object. The foldable lighting system may also be placed with the front opening facing upward, having the object placed on the back panel, and a photographer can shoot photos of the object from the top of the object. The front cover with double zipper heads can completely enclose the foldable lighting system for shooting highly reflective items. The removably connected supporting legs can fit a user's need when there is no other support on which the foldable lighting system can be put on. The universal power plug can be used for power sources with 160-240 volts, thus the foldable lighting system can be used in different regions.

It will be apparent to those skilled in the art that various modifications and variations can be made to the foldable lighting system. Other embodiments will be apparent to those skilled in the art from consideration of the specification and practice of the disclosed foldable lighting system. It is intended that the specification and examples be considered as exemplary only, with a true scope being indicated by the following claims and their equivalents.

What is claimed is:

1. A foldable lighting system comprising:
   a light housing having a light source;
   a base panel, a back panel, and two side panels, the back panel being pivotally coupled to the light housing and being foldable relative to the light housing, each of the two side panels having at least two sections, the at least two sections including a first section pivotally coupled to the light housing, and a second section pivotally coupled to the base panel, wherein the first section and the second section of each of the side panels are pivotally coupled to each other; and
   a front cover attached to a front face of the foldable lighting system, wherein the front cover includes a selectively operable closure assembly.

2. The foldable lighting system of claim 1, wherein the light source includes at least one compact fluorescent light bulb.

3. The foldable lighting system of claim 1, wherein the selectively operable closure assembly includes a zipper having multiple zip heads.

4. The foldable lighting system of claim 1, wherein the front cover is attached to the front face of the foldable lighting system by hook and loop fasteners.

5. The foldable lighting system of claim 1, wherein the light housing includes at least one ventilation hole.

6. The foldable lighting system of claim 1, further including a diffusing panel disposed at a bottom of the light housing, such that the light housing provides substantially uniformly diffused lighting through the diffusing panel.

7. A foldable lighting system comprising:
   a light housing having a light source,
   a base panel, a back panel, and two side panels, the back panel being pivotally coupled to the light housing and being foldable relative to the light housing, each of the two side panels having at least two sections, the at least two sections including a first section pivotally coupled to the light housing, and a second section pivotally coupled to the base panel, wherein the first section and the second section of each of the side panels are pivotally coupled to each other; and
   legs removably attached to the base panel for supporting the base panel.

8. The foldable lighting system of claim 7, wherein the legs each includes a plurality of sections removably coupled to each other.

9. A foldable lighting system comprising:
   a light housing having a light source;
   a base panel, a back panel, and two side panels, the back panel being pivotally coupled to the light housing and being foldable relative to the light housing, each of the two side panels having at least two sections, the at least two sections including a first section pivotally coupled to the light housing, and a second section pivotally coupled to the base panel, wherein the first section and the second section of each of the side panels are pivotally coupled to each other; and
   a lock to lock the light housing with the base panel after the foldable lighting system is folded.

10. A foldable lighting system comprising:
   a light housing having a light source;
   a base panel, a back panel, and two side panels, the back panel being pivotally coupled to the light housing and being foldable relative to the light housing, each of the two side panels having at least two sections, the at least two sections including a first section pivotally coupled to the light housing, and a second section pivotally coupled to the base panel, wherein the first section and the second section of each of the side panels are pivotally coupled to each other; and
   a diffusing panel disposed at a bottom of the light housing, such that the light housing provides substantially uniformly diffused lighting through the diffusing panel, wherein the diffusing panel is removably attached to the bottom of the light housing.

11. A foldable lighting system comprising:

a light housing having a light source;

a base panel, a back panel, and two side panels, the back panel being pivotally coupled to the light housing and being foldable relative to the light housing, each of the two side panels having at least two sections, the at least two sections including a first section pivotally coupled to the light housing, and a second section pivotally coupled to the base panel, wherein the first section and the second section of each of the side panels are pivotally coupled to each other; and a diffusing panel disposed at a bottom of the light housing, such that the light housing provides substantially uniformly diffused lighting through the diffusing panel, wherein the light housing includes a pair of sliding channels for receiving the diffusing panel, and the diffusing panel is slidably received in the sliding channels.

12. A foldable lighting system comprising:

a light housing having a light source and a diffusing panel disposed at a bottom of the light housing; and a box structure supporting the light housing, the box structure having a base panel, a back panel, and two side panels, the back panel being pivotally coupled to the light housing and being foldable relative to the light housing, each of the two side panels having at least two sections, the at least two sections including a first section pivotally coupled to the light housing, and a second section pivotally coupled to the base panel,
wherein the first section and the second section of each of the side panels are pivotally coupled to each other.

13. The foldable lighting system of claim 12, wherein the diffusing panel is removably attached to the bottom of the light housing.

14. The foldable lighting system of claim 12, wherein the light housing includes a pair of sliding channels for receiving the diffusing panel, and the diffusing panel is slidably received in the sliding channels.

15. The foldable lighting system of claim 12, wherein the light housing and the box structure form an integral unit.

16. The foldable lighting system of claim 12 further comprising legs attached to the base panel of the box structure for supporting the box structure.

17. The foldable lighting system of claim 16, wherein the legs each includes a plurality of sections removably coupled to each other.

18. The foldable lighting system of claim 12, wherein the light housing includes at least one ventilation hole.

19. The foldable lighting system of claim 12 further comprising a front cover attached to a front face of the foldable lighting system, wherein the front cover includes a selectively operable closure assembly.

* * * * *